United States Patent [19]

Chappell et al.

[11] 4,226,440
[45] Oct. 7, 1980

[54] ADAPTER DEVICE FOR LOWERING THE FRONT END OF A VEHICLE

[76] Inventors: Thurman P. Chappell, 6171 Montgomery Pl., San Jose, Calif. 95135; Fredrick J. Chantler, 671 La Sierra Way, Gilroy, Calif. 95020

[21] Appl. No.: 964,648

[22] Filed: Nov. 29, 1978

[51] Int. Cl.³ .............................................. B60G 11/14
[52] U.S. Cl. .................................... 280/660; 280/674
[58] Field of Search ............... 280/660, 661, 666, 674, 280/96.1, 673, 675

[56] References Cited
U.S. PATENT DOCUMENTS

| 2,900,196 | 8/1959 | Nenke | 280/96.1 |
| 3,061,344 | 10/1962 | Gray | 280/96.1 |
| 3,161,419 | 12/1964 | Schaaf | 280/96.1 |

Primary Examiner—John J. Love
Assistant Examiner—John A. Carroll
Attorney, Agent, or Firm—C. Michael Zimmerman; Robert K. Stoddard

[57] ABSTRACT

The adapter includes a spacer which fits in place of the ball joint at the outer end of the lower control arm. The ball joint is mounted within one end of a sleeve, the other end of which is threaded to fit over the spacer. As a result, the ball joint is secured in a position which is elevated above the lower control arm, causing a lowering of that member and of the vehicle with respect to the wheel and the road surface.

4 Claims, 4 Drawing Figures

U.S. Patent     Oct. 7, 1980     4,226,440
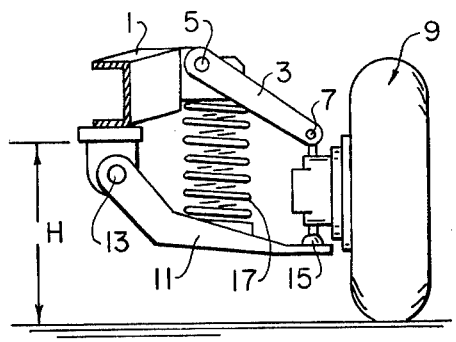
FIG. 1
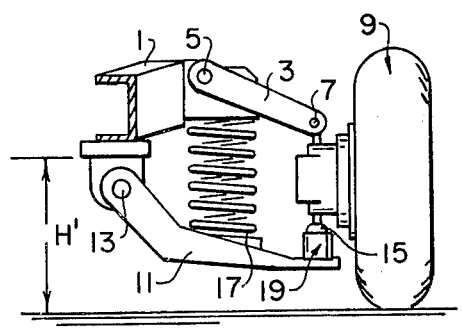
FIG. 2
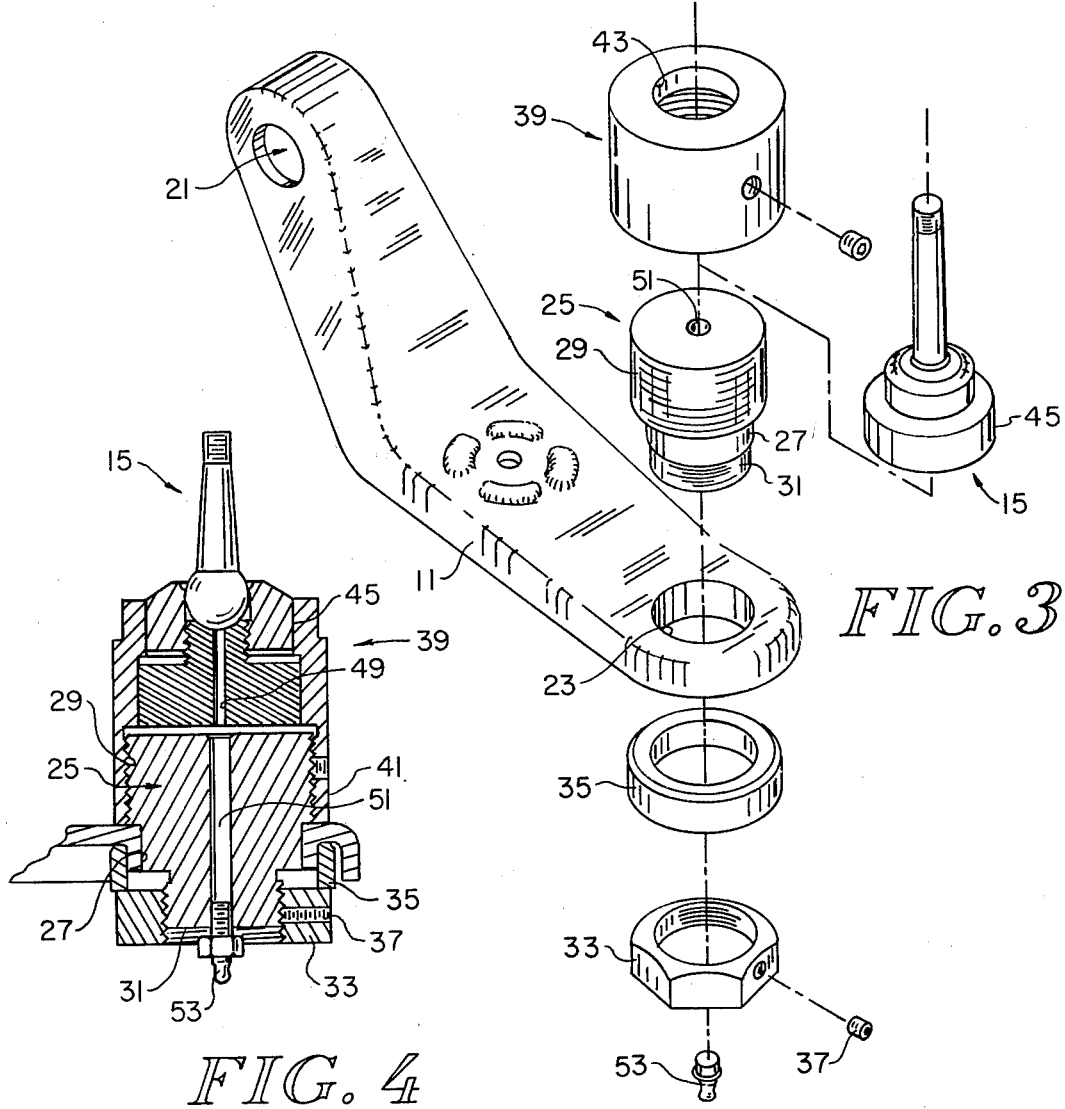
FIG. 3
FIG. 4

ADAPTER DEVICE FOR LOWERING THE FRONT END OF A VEHICLE

BACKGROUND OF THE INVENTION

The desire to lower the front end of a motor vehicle has existed for a variety of reasons. Among these are the wish to achieve a certain appearance produced by having the front end of the vehicle lower than the rear, a configuration which is thought by many to give the vehicle a sporting or racing appearance.

Another reason for wishing to lower the front end of a vehicle is the desire to reduce the height of the center of gravity of the vehicle. Such lowering of the center of gravity can improve the handling of the vehicle in sharp turns.

Prior art means of lowering the front end of a vehicle consisted mostly of the fitting of special small diameter wheels or tires or both, or various expedients for shortening the front springs.

The fitting of small diameter wheels and tires has the disadvantages that rolling resistance, maximum road adhesion and load carrying capacity of the smaller diameter front tires is generally inferior. Lost road adhesion and load carrying capacity can be partly restored if the width of the tire is increased corresponding to the reduction in diameter. However, increasing the width of the tires often results in interference between the wide tire and suspension components, under parts of the body and frame, etc., on sharp bumpy turns. Furthermore, the special front tires required to lower the front end are no longer interchangeable with the tires on the rear, preventing the customary practice of rotating the tires from front to rear to equalize wear. Finally, the cost of procuring new tires or wheels in order to lower the front end is excessive.

The second known method of lowering the front end of a vehicle is to shorten the front springs such that they permit the front end of the vehicle to sag or drop. Sometimes this is carried out by heating some of the coils of each front spring near one end of the spring such that the spring softens slightly and sags. Because of the uncontrolled changes in the metallurgy of the springs produced by this method, the spring can no longer be considered reliable. Alternatively, the spring can be removed from the vehicle and one or more coils can then be cut off, although this is a cumbersome procedure. Furthermore, whichever means is chosen to shorten the front springs, front suspension travel, needed to accommodate surface variations in roads, is reduced and spring rate or stiffness is increased.

In view of the above problems associated with prior art attempts to lower the front end of vehicles, a new approach was needed. An ideal means of lowering the front end of a vehicle would not disturb the normal functioning of the front suspension, would not stiffen or worsen the ride of the vehicle in any way, and would not require any expensive new parts to replace those already on the vehicle.

SUMMARY OF THE INVENTION

The present invention lowers the front end of a motor vehicle by means of an adapter device which fits between the lower control arm of the front suspension and the ball joint, spacing the ball joint above the surface of the lower control arm thereby permitting the lower control arm to assume a lower position with respect to the wheel than is true in the unaltered suspension.

It is an object of the present invention to produce a lowering of a vehicle by means which introduce a minimum of disturbance of the normal suspension geometry of the vehicle.

It is a further object of the present invention to cause a lowering of the front end of a vehicle by means which permit the full normal suspension travel.

It is an object of the present invention to cause a lowering of the front end of a vehicle by means which cause the lower ball joint to be elevated above the surface of the lower control arm of the front end of the vehicle.

It is a further object of the invention to achieve the immediately preceding object by means of an adapter which fits in place of the ball joint on the lower control arm, and which adapter accepts at its upper end a standard ball joint structure.

These and other features, objects and advantages of the present invention will become apparent from a reading of the following description of a preferred embodiment of the invention, and a perusual of the drawings in which:

BRIEF DESCRIPTION OF THE DRAWING

FIG. 1 is a cut-away view showing a front wheel and associated front suspension components of a motor vehicle;

FIG. 2 shows the same front wheel and suspension after incorporation of the adapter device of the present invention;

FIG. 3 is an exploded view showing the parts of the adapter device of the present invention and the connections of these parts with a ball joint and lower control arm;

FIG. 4 is a cross-sectional view of the adapter device of the present invention.

DESCRIPTION OF A PREFERRED EMBODIMENT

Turning now to FIG. 1, a portion of the unaltered front suspension of a spring suspended vehicle is shown longitudinally. The vehicle might, for example, be a passenger automobile or van. Frame member 1 is a section of steel channel forming a part of the vehicle frame in a separate frame-and-body construction, but could in the case of a unitized frame-and-body structure, be a portion of the body of the vehicle. Upper control arm 3 is pivotally mounted to frame member 1 by means of upper shaft 5, passing through the inner end of arm 3. At the outer end of arm 3 an upper ball joint 7 attaches arm 3 to a front wheel 9.

Similarly, a lower control arm 11 is joined to the vehicle by means of a lower shaft 13, and to wheel 9 by means of a lower ball joint 15. A coil spring 17 is held in compression between lower control arm 11 and frame member 1, providing a compliant means of suspension for the vehicle. Although not shown, a shock absorber for damping suspension movement would normally be incorporated in the structure of FIG. 1 in a known way.

As can readily be seen in FIG. 1, the height H of the frame is determined by the equilibrium of forces including the downward force of gravity acting at this portion of the vehicle, and the upward force provided by spring 17 acting between lower control arm 11 and frame member 1.

Turning now to FIG. 2, the same front suspension is shown after the installation of an adapter device 19 according to the present invention, for lowering the front end of the vehicle. Adapter device 19 is inserted between ball joint 15 and lower control arm 11, so as to elevate ball joint 15 above the surface of lower control arm 11. Alternatively stated, adapter device 19 permits lower control arm 11 to assume a new and lower position with respect to wheel 9.

Thus, since the heights of wheel 9 and upper and lower ball joints 11 and 15 remain the same as before, the effect of the insertion of adapter device 19 between lower ball joint 15 and lower control arm 11 is actually to lower the height of lower control arm 11 with respect to the road surface. Since the equilibrium of forces between the downward force provided by vehicle weight and the upward force provided by coil spring 17 is relatively unaltered by the insertion of adapter device 19, the entire vehicle as represented in FIG. 2 by frame member 1 is lowered to a new height H' by the insertion of adapter device 19.

FIGS. 3 and 4 show details of the construction of adapter device 19 according to the present invention. In FIG. 3, lower control arm 11 is shown more clearly in perspective view. An inner aperture 21 through which lower shaft 13 (shown in FIG. 1) passes, serves as a means of attaching lower arm 11 to the frame of the vehicle. An outer aperture 23, in a cylindrical member 23' is normally provided in lower control arm 11 for attachment of ball joint structure 15.

Lower control arm 11 in the form shown in FIG. 3 would most likely be formed from sheet steel stock by a series of stamping and punching operations. Alternatively, in some vehicles, lower arm 11 might be manufactured by forging from steel stock. The attachment point for ball joint 15 has been illustrated as an integrally formed cylindrical member 23' in the shape of a sleeve surrounding and defining aperture 23 in order to provide stiffening and support for the mounting of ball joint structure 15. However, in some control arms 11, the ball joint attachment point might be merely a punched hole in the sheet metal of the control arm 11.

In accordance with the present invention, ball joint structure 15 is replaced by a cylindrical spacer 25 which may be lathe- or screw machine-turned from steel bar stock. As best seen in FIG. 4, spacer 25 has a cylindrical axial portion 27 which is machined to fit within aperture 23 in place of ball joint structure 15. An enlarged threaded end portion 29 limits the depth of penetration of spacer 25 into aperture 23. A threaded boss 31 extends coaxially away from axial portion 27 and serves as a means of retaining spacer 25 within aperture 23, in combination with a nut 33 and a reinforcing ring 35. Nut 33 may be formed from hexagonal steel bar stock and reinforcing ring 35 may be formed from steel tubing. A set screw 37 may be employed to lock nut 33 on threaded boss 31, or any other known means may be employed for this purpose.

A sleeve member 39 serves as a connector means for joining ball joint structure 15 to cylindrical spacer 25. For this purpose, sleeve member 39 includes a threaded reentrant surface portion 41 at the lower end thereof having threads which match those of enlarged threaded end portion 29 of spacer 25. Portion 41 thus defines a threaded aperture at one end of sleeve member 39 for receiving the threaded end portion 29. At its other end sleeve member 39 includes an aperture 43 for receiving ball joint structure 15. Thus, in the presently described embodiment, threaded end portion 29 and sleeve member 39 both serve as a means for fastening cylindrical spacer 25 and ball-joint structure 15 together end-to-end, or "in series", such that they form a mechanical unit which can be interposed between control arm 11 and wheel 9. In this way, the distance between lower control arm 11 and wheel 9 is increased so as to cause lowering of control arm 11 and the remainder of the vehicle, with respect to wheel 9 and the road.

Ball joint structure 15 is a readily available item of commerce which does not form a part of the present invention. However, its external structure must be securely accommodated within the upper portion of sleeve member 39 and for this purpose, aperture 43 is dimensioned to provide a close fit with the corresponding portion of ball joint structure 15. Because of the particular form of ball joint structure 15 illustrated in the drawings, no further means of securing the structure within sleeve 39 are necessary.

Ball joint structure 15 is inserted from the bottom of sleeve member 39 in FIG. 4 and is securely retained against the upward forces exerted on it in operation by virtue of an enlarged cylindrical base portion 45. However, in the event that another form of ball joint structure 15 is encountered, the skilled worker may find it necessary to provide any other known alternative means to secure ball joint structure in the upper end of sleeve member 39.

With ball joint structure 15 in place within sleeve 39, sleeve 39 is securely screwed onto the enlarged threaded end portion 29 of spacer 25 and may be locked thereon by means of a set screw 47 or any other known means of preventing further rotation.

Ball joint structure 15 includes a lubricant entrance aperture 49 to permit periodic routine greasing of the ball joint in use. Accordingly, spacer 25 incorporates a coaxial gland 51 which provides fluid communication with entrance aperture 49 and is threaded at its external opening to receive a standard grease fitting 53. Grease fitting 53 and gland 51 permit the normal routine pressure lubrication of ball joint structure 15. Although not shown, ball joint structure 15 may be provided with a flexible cover or boot, serving as a shield against water and dirt.

Although the invention has been described with some particularity in reference to a preferred embodiment, it will be understood by skilled workers in the art that many modifications to the disclosed structure can be made without exceeding the scope of the invention, which is intended to be interpreted only from the following claims.

We claim:

1. An adapter device for integral incorporation into the front suspension of a motor vehicle to lower the front end of said motor vehicle with respect to the road, said motor vehicle being of the type employing a control arm pivotally connected at its inner end to the frame of the vehicle and pivotally connected at its outer end to a front wheel of said vehicle by means of a ball-joint assembly extending therebetween; said adapter device comprising:

a spacer means, for mechanical interposition in series with said ball-joint assembly between said control arm and said wheel, to lower said control arm with respect to said wheel, fastening means on one end of said spacer means to securely connect said spacer means to one end of said ball-joint assembly to form therebetween a mechanical unit, the other end of said ball-joint assembly and the other end of said spacer means being adapted to permit interconnection of said mechanical unit between said control arm and said wheel.

2. The adapter device of claim 1 wherein said other end of said spacer means is adapted for connection to said control arm.

3. The method of lowering the front end of a motor vehicle of the type in which the front wheels are pivotally mounted to a laterally extending control arm by means of a ball-joint assembly, comprising the steps:

(1) providing an adapter device comprising: a spacer means, for mechanical interposition in series with said ball-joint assembly between said control arm and said wheel, to lower said control arm with respect to said wheel; a fastening means on one end of said spacer means to securely connect said spacer means to one end of said ball-joint assembly to form therebetween a mechanical unit, the other end of said ball-joint assembly and the other end of said spacer means being adapted to permit interconnection of said mechanical unit between said control arm and said wheel, (2) interconnecting said mechanical unit comprising said spacer means and said ball-joint assembly between said control arm and said wheel to thereby lower said control arm and vehicle with respect to said wheel.

4. The method of claim 3 wherein said spacer means is interconnected between said ball-joint assembly and said control arm.

* * * * *